United States Patent
Matsuda (10) Patent No.: US 7,150,227 B2
(45) Date of Patent: Dec. 19, 2006

(54) MULTI-STAGE IGNITION TYPE GAS GENERATOR

(75) Inventor: Naoki Matsuda, Hyogo (JP)

(73) Assignee: Daicel Chemical Industries, Ltd., Sakai (JP)

(*) Notice: Subject to any disclaimer, the term of this patent is extended or adjusted under 35 U.S.C. 154(b) by 84 days.

(21) Appl. No.: 10/858,051

(22) Filed: Jun. 2, 2004

(65) Prior Publication Data

US 2004/0244632 A1    Dec. 9, 2004

Related U.S. Application Data

(60) Provisional application No. 60/476,179, filed on Jun. 6, 2003.

(30) Foreign Application Priority Data

Jun. 3, 2003    (JP)    ............... 2003-157671

(51) Int. Cl.
*B60R 21/26* (2006.01)
(52) U.S. Cl. ................. 102/202; 280/741
(58) Field of Classification Search ........ 102/202; 280/741
See application file for complete search history.

(56) References Cited

U.S. PATENT DOCUMENTS

| | | | |
|---|---|---|---|
| 6,032,979 A | 3/2000 | Mossi et al. | 280/741 |
| 6,068,291 A | 5/2000 | Lebaudy et al. | |
| 6,139,055 A * | 10/2000 | Dahl et al. | 280/741 |
| 6,199,906 B1 | 3/2001 | Trevillyan et al. | 280/741 |
| 6,237,498 B1 | 5/2001 | Winterhalder et al. | |
| 6,299,203 B1 | 10/2001 | Muller | |
| 6,302,979 B1 | 10/2001 | Matsuoka et al. | 280/741 |
| 6,412,815 B1 | 7/2002 | Nakashima et al. | 280/736 |
| 6,543,805 B1 | 4/2003 | McFarland et al. | 280/736 |
| 6,659,500 B1 * | 12/2003 | Whang et al. | 280/741 |
| 6,857,658 B1 * | 2/2005 | Iwai et al. | 280/741 |
| 2001/0013300 A1 | 8/2001 | Lutz et al. | |
| 2002/0050703 A1 | 5/2002 | Whang et al. | 280/737 |

FOREIGN PATENT DOCUMENTS

| | | |
|---|---|---|
| EP | 1024062 A1 | 8/2000 |
| JP | 2001-97175 A | 4/2001 |
| JP | 2001-239914 A | 9/2001 |

* cited by examiner

*Primary Examiner*—Stephen M. Johnson
(74) *Attorney, Agent, or Firm*—Birch, Stewart, Kolasch & Birch, LLP (57) ABSTRACT

A multi-stage ignition type gas generator has a first combustion chamber and a second combustion chamber defined independently from each other, and a third combustion chamber through which a gas generated in the first combustion chamber and the second combustion chamber passes before reaching a gas discharge port. In a partition wall defining the first combustion chamber and the third combustion chamber and a partition wall defining the second combustion chamber and the third combustion chamber, a restriction means, which opens a communicating port communicating a combustion chamber and the third combustion chamber only by gas pressure generated in the combustion chamber defined inside the partition wall, is arranged, and a gas generating agent disposed in the first combustion chamber and a gas generating agent disposed in the second combustion chamber are different in at least one of all gas output and gas output per unit time.

9 Claims, 4 Drawing Sheets

MULTI-STAGE IGNITION TYPE GAS GENERATOR

CROSS-REFERENCE TO RELATED APPLICATIONS

This Nonprovisional application claims priority under 35 U.S.C. § 119(e) on U.S. Provisional Application No. 60/476,179 filed on Jun. 6, 2003 and under 35 U.S.C. § 119(a) on Patent Application No. 2003-157671 filed in Japan on Jun. 3, 2003, the entire contents of which are hereby incorporated by reference.

BACKGROUND OF THE INVENTION

1. Field of the Invention

The present invention relates to a gas generator for an air bag for protecting a vehicle occupant from an impact of vehicle crash and so on.

2. Description of the Related Art

An air bag system installed in a vehicle, upon receiving an impact such as that due to a crash, develops an inflatable bag and prevents a situation in which a vehicle occupant collides with components in a vehicle (a steering wheel, a windshield, et al.), to protect the vehicle occupant. An air bag is inflated using an inflation gas, and a gas generator is used to generate the gas. Since the time between receiving an impact and developing a bag is very short, an ability of generating a sufficient gas to rapidly develop the air bag in a short period of time is required to such a gas generator.

However, on the other hand, when developing speed is increased uniformly to develop rapidly an air bag in a short period of time, there may occurred a case in which an impact of a rapidly inflating bag affects a vehicle occupant. For example, in comparing a vehicle's crash at low speed with a vehicle's crash at high speed, the affect of an impact to a vehicle occupant are different, and as is obvious, the former has less impact to a vehicle occupant. So, if the bag is developed rapidly even in a crash at low speed just like a crash at high speed, the development of a bag itself possibly affect the vehicle occupant.

A gas generator generating gas in multi-stages is proposed in order to prevent this.

For example, in JP-A 2001-97175, a gas generator in which two combustion chambers are disposed, a gas generating agent in each combustion chamber burns independently, and the generated gas amount is adjusted according to a degree of an impact, is proposed.

In addition, there is JP-A 2001-239914 as a related art to the present application. In JP-A 2001-239914, an inflator for an air bag in which a pipe 9 and a pipe 39 are arranged in a housing, a booster propellant 33 and an initiator 23 igniting it are disposed in the pipe 39, and a propellant 12 and an initiator 13 are disposed in another pipe 9, is shown. In addition, a main propellant 31 is disposed outside the pipes 9 and 39 (inside of the housing: a first combustion chamber 43). Furthermore, in the pipes 9 and 39, gas ejecting ports 9e and 39e are formed respectively, and they communicate with the first combustion chamber.

However, as described that "the second combustion chamber is ignited 100 msec after the detection of a crash, for example, in a light crash. This is because, in a light crash, a low inflating pressure of an air bag is enough (paragraph number [0024])", in the gas generator in this document, when the crash impact is small, a propellant 12 in the second combustion chamber does not participate in an inflation of a bag in a crash substantially. In addition, since the gas ejecting port 9e in a cylindrical side plate with large diameter 9c is choked with a valve plate 11 but the gas ejecting port 39e in a cylindrical side plate 39c is not choked with a valve plate 11, in the case of burning the propellant 12 in the second combustion chamber, a booster propellant 33 is also burnt, that is all the propellant is burnt. So, in the inflator for an air bag of JP-A 2001-239914, there is a case in which a power of a bag development becomes large even in a light crash, and a developing pressure of a bag cannot be adjusted depending on a degree of the impact.

In addition, in US-A 2002/0050703, a gas generator having three chambers in a housing is disclosed. In a main combustion chamber, a first combustion chamber 42 and a second combustion chamber 44, a main propellant charge 82, a first ignition compound 78, and a second ignition compound 80 are disposed respectively, and the first ignition compound 78 and the second ignition compound 80 are ignited by an igniter 48 and an igniter 58, respectively. In addition, the first combustion chamber 42 and the main combustion chamber communicate with each other via a communicating port 50, and the second combustion chamber 44 and the main combustion chamber communicate with each other via a communicating port 60.

However, since the communicating port 50 connecting the first combustion chamber 42 and the main combustion chamber is only closed with a first aluminum piece from the first combustion chamber side, and a shield 84 as is disposed on the communicating port 60 is not arranged, when the propellant 80 in the second combustion chamber 44 is burnt, the first ignition compound 78 is also burnt, that is all the ignition compound is burnt. So, just like the case of JP-A 2001-239914, there is a case in which the gas generator shown in US-A 2002/0050703 possibly has a large power for developing a bag in a light crash, and a developing pressure of the bag cannot be adjusted depending on a degree of the impact.

SUMMARY OF THE INVENTION

The present invention provides a multi-stage ignition type gas generator which, in addition to being able to adjust a generation output of a gas (that is, a degree of bag development) in response to magnitude of a crash, can further adjust an operation output (that is, a degree of bag development) more finely even when an impact is small. And the invention provides a gas generator which, in addition to being able to thus adjust the operation output, realizes miniaturization of a gas generator to eliminate a problem of disposition place, and further improves manufacturing easiness.

To solve the above task, the present invention provides a multi-stage ignition type gas generator which comprises, in a housing having a gas discharge port, a first combustion chamber and a second combustion chamber defined independently from each other, and a third combustion chamber through which a gas generated in at least one of the first combustion chamber and the second combustion chamber passes before reaching the gas discharge port, wherein the first combustion chamber and the third combustion chamber, and the second combustion chamber and the third combustion chamber are defined by a partition wall respectively, and, in both partition walls, a restriction means, which opens a communicating port communicating one of the first and second combustion chambers and the third combustion chamber only by gas pressure generated in the combustion chamber defined inside the partition wall, is arranged, and wherein, in all of the combustion chambers, a gas generating agent burnt and generating gas is disposed respectively, and the gas generating agent disposed in the first combustion chamber and the gas generating agent disposed in the second combustion chamber are different in at least one of all gas output and gas output per unit time, and further a first ignition means directly igniting and burning the gas generating agent is disposed in the first combustion chamber and a second ignition means directly igniting and burning the gas generating agent is disposed in the second combustion chamber. For example, when the first combustion chamber and the third combustion chamber are defined by a first partition wall and the second combustion chamber and the third combustion chamber are defined by a second partition wall, in the first partition wall, a first restriction means, which opens a first communicating port communicating the first combustion chamber and the third combustion chamber only by gas pressure generated in the first combustion chamber, can be arranged, and, in the second partition wall, a second restriction means, which opens a second communicating port communicating the second combustion chamber and the third combustion chamber only by gas pressure generated in the second combustion chamber, can be arranged.

In such a gas generator of the present invention, by adjusting an activation timing and an activation order of the first ignition means and the second ignition means, even when the crash impact is small, the operation output and the operation degree of a gas generator can be adjusted more finely depending on a degree of the impact.

That is, since, in the gas generator of the present invention, the first combustion chamber and the third combustion chamber, and the second combustion chamber and the third combustion chamber can communicate with each other via the communicating port respectively, the first combustion chamber and the second combustion chamber are defined independently from each other, a restriction means is arranged in the partition wall defining the first combustion chamber and the third combustion chamber, and the second combustion chamber and the third combustion chamber, and the restriction means opens the communicating port communicating a combustion chamber and the third combustion chamber only by gas pressure generated in the combustion chamber defined inside the partition wall, flame does not enter the first combustion chamber or the second combustion chamber from the third combustion chamber side. So, when the first ignition means is activated first, a gas generating agent in the first combustion chamber burns, the flame and high temperature gas passes through a communicating port provided between the first combustion chamber and the third combustion chamber (hereinafter, referred to as the first communicating port) and burns a gas generating agent in the third combustion chamber, and a gas is generated in the first combustion chamber and the third combustion chamber (that is, no gas is generated in the second combustion chamber). On the other hand, when the second ignition means is activated first, a gas generating agent in the second combustion chamber burns, the flame and high temperature gas likewise passes through a communicating port provided between the second combustion chamber and the third combustion chamber (hereinafter, referred to as the second communicating port) and burns a gas generating agent in the third combustion chamber, and a gas is generated in the second combustion chamber and the third combustion chamber (that is, no gas is generated in the first combustion chamber). Furthermore, when the first ignition means and the second ignition means are activated simultaneously or with a small time lag, a gas can be generated in the first combustion chamber, the second combustion chamber and the third combustion chamber. And as described below, with making at least one of combustion heat, combustion temperature, all gas output and gas output per unit time at the time of combustion different in the gas generating agent disposed in the first combustion chamber and the second combustion chamber, by adjusting need or no need of ignition, ignition order, ignition interval and so on of the first ignition means and the second ignition means, the operation output and the operation degree of a gas generator can be adjusted finely.

In particular, the above effect is obtained, since, in the above gas generator of the present invention, a restriction means arranged in the partition wall defining the first combustion chamber and the third combustion chamber, and the second combustion chamber and the third combustion chamber opens a communicating port communicating a combustion chamber and the third combustion chamber only by gas pressure generated in the combustion chamber defined inside the partition wall. That is, such as that, for example, when the gas generating agent of the first combustion chamber and the third combustion chamber are burnt by ignition of only the first ignition means, a high temperature gas and flame are prevented from passing through the second communicating port and burning the unburnt gas generating agent in the second combustion chamber, the restriction means restricts gas flow such that it generates one-way gas flow from the first combustion chamber to the third combustion chamber or from the second combustion chamber to the third combustion chamber, and the operation output and the operation degree of a gas generator can be adjusted finely by using such a restriction means.

For example, such a restriction means can be arranged from the third combustion chamber side on all the communicating ports formed in at least one of the partition wall defining the first combustion chamber and the third combustion chamber and the partition wall defining the second combustion chamber and the third combustion chamber.

In this case, for at least one of restriction means arranged on the communicating port, a member which conducts at least one of deformation, destruction by fire, detachment, displacement, rupture and break only by the combustion of the gas generating agent in the combustion chamber defined in a partition wall formed with the communicating port, and that opens the communicating port, can be used. Such a member can be selected independently or in association with each other from, for example, a metal tape, a cover and a check valve closing the communicating port. That is, a metal tape is used as either restriction means and a check valve is used as another restriction means, or alternatively, a metal tape, a cover or a check valve can be used as all of the restriction means. As to such a restriction means, more concretely, by using an aluminum or stainless seal tape, more preferably a stainless seal tape, and attaching these tapes to close the first communicating port and the second communicating port from the third combustion chamber side, the high temperature gas and flame can flow in one way from the first combustion chamber and the second combustion chamber to the third combustion chamber (the opposite gas flow can be prevented). In addition, instead of such a seal tape, a valvular one (check valve etc.) or a cup-shaped one capable of performing the same function (the above one-way passage of gas and flame) can be used as a restriction means. In particular, when a valvular one or a cup-shaped one is used as a restriction means, the valvular or cup-shaped restriction means can be arranged inside the communicating port to close the communicating port, as well as being arranged from the third combustion chamber side to close the communicating port.

Anyway, the restriction means in the above embodiment opens the communicating port formed in advance in the partition wall by at least one of rupture, break, detachment, deformation, displacement, destruction by fire and so on occurred by the combustion of the gas generating agent in the chamber (a first combustion chamber or a second combustion chamber) defined by the partition wall provided with the restriction means, and does not conduct any one of rupture, break, detachment, deformation, displacement, destruction by fire and so on to open the communicating port.

In addition, when a communicating port is formed in at least one of the partition wall defining the first combustion chamber and the third combustion chamber and the partition wall defining the second combustion chamber and the third combustion chamber, as the restriction means, a member, which has a portion facing the communicating port and diverting the gas released from the combustion chamber defined inside a partition wall provided with the communicating port, can be used. As such a restriction means, for example, a member, which is provided with a wall portion facing the communicating port with a required interval and a fixing portion fixing the wall portion to another configuration member of the gas generator, such as a partition wall, can be used. More preferably, the interval in the portion facing the communicating port is an interval of such an extent that the gas generating agent does not get into. When such a restriction means is used, the communicating port formed in the partition wall does not need to be closed with a member restricting flow direction of a gas and can be always open. However, for the purpose of moisture proof of a gas generating agent et al., it is desirable to close with a member not restricting flow direction of gas (for example, an aluminum tape formed thinner and so on).

Furthermore, a restriction means in the present invention also includes a restriction means which can be used even when a communicating port is not formed in advance in the partition wall defining the first combustion chamber and the third combustion chamber or the partition wall defining the second combustion chamber and the third combustion chamber.

That is, a bent portion projecting to the third combustion chamber side is formed in at least one of the partition wall defining the first combustion chamber and the third combustion chamber and the partition wall defining the second combustion chamber and the third combustion chamber, and a fragile portion formed in this bent portion corresponds to the restriction means. In this case, the fragile portion functioning as the restriction means is formed such that it opens only by the combustion of the gas generating agent in the combustion chamber defined inside the partition wall provided with the fragile portion, and produces the communicating port. The opening of the fragile portion by combustion of the gas generating agent is obtained by at least one of rupture, break, detachment, deformation, displacement, destruction by fire and so on of the fragile portion by a flame and gas produced in a combustion of a gas generating agent, and an open communicating port is produced.

The bent portion formed in the partition wall can be made by forming one end portion of the partition wall itself into a cone shape (circular cone shape, pyramid shape et al.), and also by forming an outward projection (to the third combustion chamber side) on part of a side surface of the partition wall (including a circumferential surface). In addition, the fragile portion can be realized, for example, by forming a ditch having a V-shaped cross section (or a shape whose center is hollow) or another ditch in a projecting surface of the bent portion (the surface existing on the third combustion chamber side).

And in the gas generator of the present invention, the restriction means in the partition wall defining the first combustion chamber and the third combustion chamber can differ from that in the partition wall defining the second combustion chamber and the third combustion chamber. For example, in one partition wall, a communicating port is formed and a metal tape closing this communicating port can become the restriction means, and, in another partition wall, a bent portion is formed and a fragile portion formed in this bent portion can become the restriction means.

For example, the first ignition means can comprise, for example, only an electric type igniter which, in many cases, comprises an electric resistor and a priming, and besides, it can comprise a combination of an electric type igniter and an enhancer which enhances energy of the igniter and ignites and burns the gas generating agent. In addition, as the enhancer, boron potassium nitrates, which generate mainly thermoparticulates by combustion, et al., can be used. Furthermore, the second ignition means can comprise using an igniter and an enhancer in the same way as the first ignition means. The first ignition means may be same as or different from the second ignition means in shape of the igniter used and an amount of the priming loaded in the igniter. Further, when an enhancer is used, a used amount, composition, composition ratio and so on of the enhancer in the first ignition means can be different from those of the second ignition means.

In the above gas generator, it is also important that, in all combustion chambers, a gas generating agent, which burns to generate a gas, respectively is disposed. Such a gas generating agent is used for a purpose of at least generating a gas by combustion to inflate an air bag (bag body), and is different in this point from an enhancer or a transfer charge used for a purpose of enhancing flame for ignition generated by the igniter at activation. That is, since such an enhancer or a transfer charge is formed using boron potassium nitrate, the generated materials are mainly thermoparticulates, which does not directly contribute to inflation of an air bag. So, an enhancer or a transfer charge constitutes the ignition means for burning the gas generating agent, and obviously differs from the gas generating agent.

But when a gas generating agent having low ignitability is used for inflating an air bag, and when a conventional gas generating agent generating a high-temperature gas or flame is used as a transfer charge for improving ignitability of the gas generating agent (that is, for continuance of the combustion of the transfer charge itself), it is strictly considered as "a transfer charge" for igniting the primary gas generating agent. For example, when boron potassium nitrate being used as a conventional transfer charge is ignited by an igniter et al., its combustion completes in a relatively short time. Even when a gas generating agent having poor ignitability is burned, using such a transfer charge, combustion time of the transfer charge itself is too short to transfer igniting energy to the gas generating agent, so that the gas generating agent may not be ignited or the combustion may stop on the way after ignited. Thus, in order to lengthen combustion time of the transfer charge itself, a gas generating agent that is conventionally used for generating a gas for inflating an air bag by combustion can be used. For example, by using a gas generating agent comprising nitroguanidine as a fuel and strontium nitrate as an oxidizer (in addition, the agent may include a binder et al.), as a transfer charge instead of a conventional boron potassium nitrate, and by adjusting its shape and surface area, combustion can be maintained for longer time compared with boron potassium nitrate. Therefore, even if, as a gas generating agent for inflating an air bag, a gas generating agent having low ignitability is used, it is exposed to a high-temperature gas and flame produced by a nitroguanidine-strontium nitrate transfer charge for a relatively long time, so that a gas generating agent is ignited securely, and combustion can be maintained. Even in such a case, the gas generating agent as a transfer charge used for improving ignitability of the gas generating agent strictly has function as "a transfer charge" used for igniting the primary gas generating agent, and its operation/effect differ from theses of the gas generating agent in the present invention, that is, the gas generating agent used to generate a gas for inflating an air bag by combustion.

In addition, the gas generating agent used in the gas generator of the present invention is to generate a gas to inflate an air bag, and mainly generates substance existing as gas even after being released into an air bag (even if temperature falls down by adiabatic expansion). In this point, it differs from boron potassium nitrates et al. which has been used as conventional enhancer. That is, if a conventional enhancer or transfer charge is loaded in either combustion chamber, the effect of the present invention is not obtained.

And in the gas generator of the present invention, the gas generating agent disposed in the first combustion chamber differs from the gas generating agent disposed in the second combustion chamber in at least one of combustion heat, combustion temperature, all gas output and gas output per unit time in combustion of the gas generating agent. This can be done, for example, by making at least one of loaded amount, shape, size, composition and composition ratio of the gas generating agent disposed in the first combustion chamber and the second combustion chamber different. By doing so, a gas generated from the first combustion chamber differs from a gas generated from the second combustion chamber in mol number, generating pressure, burning velocity, generated heat quantity et al. Even when an impact is small and part of the gas generating agent in the housing is to be burnt, a degree of gas generation can be adjusted more finely by means of which ignition means is ignited first or in which timing each ignition means is ignited et al. The judgment on which of first ignition means and the second ignition means is ignited first, in which timing ignition means is ignited, or which one only is ignited et al. can be done by the Electronic Control Unit installed in the vehicle depending on a degree of an impact, and ignition electric current is passed to the ignition means to be activated (concretely, the igniter).

In the above gas generator, the first combustion chamber and the second combustion chamber can be contained inside the third combustion chamber completely or partially, or the third combustion chamber can be sandwiched between the first combustion chamber and the second combustion chamber. In particular, when the third combustion chamber is sandwiched between the first combustion chamber and the second combustion chamber, a gas discharge port is preferably formed in a portion in which the third combustion chamber exists.

In addition, a partition wall defining the first combustion chamber and third combustion chamber and a partition wall defining the second combustion chamber and third combustion chamber may be a separate member respectively or may be a different portion (part) in the same member.

Each of the first combustion chamber and the second combustion chamber may contain only a solid gas generating agent, or alternatively, both of pressurized gas and a solid gas generating agent. In addition, a gas generating agent loaded in the third combustion chamber differs from the gas generating agent loaded in the first combustion chamber and the second combustion chamber in at least one of loaded amount, shape, size, composition, composition ratio, gas output per unit weight.

In addition, in the above gas generator, it is desirable that, in at least one of the partition wall defining the first combustion chamber and third combustion chamber and the partition wall defining the second combustion chamber and third combustion chamber, a shielding means, which prevents direct contact between a restriction means arranged in the partition wall and a gas generating agent, is arranged. It is because, if a gas generating agent is in contact with a communicating port, combustion (pressure) environment of the gas generating agent changes significantly and it becomes difficult for the gas generating agent to burn stably such as that a gas flow through a communicating port is obstructed and pressure in the combustion chamber increases, or the communicating port opens soon after the gas generating agent existing near the communicating port is burnt and the pressure in the combustion chamber decreases by rapid discharge of gas. In addition, it is because the container may be damaged by the increased pressure in the combustion chamber. Furthermore, when the restriction means opens a communicating port or produce an open communicating port by at least one of deformation, destruction by fire, detachment, displacement, rupture and break, because of the restriction means existing in a state of contacting with a gas generating agent, a free space for deformation of the restriction means which is necessary for opening of the communicating port or for produce of the open communicating port, and as a result, the restriction means may not function efficiently.

As such a shielding means, a multi perforated member or a net member, which, as well as at least supporting the gas generating agent, has an opening of a dimension not obstructing passing of gas generated by combustion of the gas generating agent, can be used.

In addition, the above gas generator can be a multi-stage ignition type gas generator in which the third combustion chamber is formed by a housing, the first combustion chamber and the second combustion chamber are inside the third combustion chamber, they are distributed in one side of the housing axial direction, and the first ignition means and the second ignition means are installed on the end portion of the side in which the first combustion chamber and the second combustion chamber are distributed in one side in the housing.

Since, in such a gas generator, the igniter is installed on one end portion side of the housing, the gas generator has a configuration suitable for a gas generator attached to a driver side of a car (a center portion of a steering wheel) and can be more miniaturized. That is, since generally one end portion of the gas generator attached to a driver side is exposed into an air bag, it is difficult to arrange an ignition means (an igniter in particular) in this one end portion. Thus, by disposing the ignition means (an igniter in particular) on the opposite side of the one end portion (the side not exposed into an air bag), assembling an air bag with the gas generator can be easy. In addition, since the igniter (in the ignition means) is arranged on the opposite side of the one end portion, it is free from restriction on disposition (wiring) of lead wires for sending operation signals to this.

In addition, the gas generator of the configuration suitable for a gas generator attached on the driver side of a car (a center portion of a steering wheel) can further be a following configuration.

That is, a multi-stage ignition type gas generator in which the third combustion chamber is formed by a housing, the first combustion chamber is inside the third combustion chamber with being defined on one end side of the housing axial direction, the second combustion chamber is inside the third combustion chamber with being defined on other end side of the housing axial direction, and the first ignition means and the second ignition means are installed on either end portion of the housing axial direction.

In particular, when two ignition means are arranged on the end of the side (the axial end portion of the housing) in which either combustion chamber exists, at least one ignition means, together with being able to communicate with the combustion chamber existing on the other end side, needs to be shielded hermetically from the combustion chamber on the side in which the ignition means exists.

Thus, by installing two ignition means on either end portion of the housing axial direction (in particular, the end portion of the side not exposed into an air bag), the ignition means (the igniter in particular) can be installed easily, and it is free from restriction on disposition (wiring) of lead wires for sending operation signals to the igniter (in the ignition means), so that a multi-stage ignition type gas generator suitable to be used in an air bag apparatus in a driver side can be obtained.

In the above gas generator, the first ignition means and the second ignition means comprises an igniter for initiating operation of the gas generator, and it is desirable that the igniter included in the first ignition means and the igniter included in the second ignition means are build into a single common igniter collar and installed to the housing. By forming in this way, since a plurality of igniters are build into one igniter collar, a step of installing a plurality of igniters to a gas generator can be simplified. In addition, when a collar provided with igniters is fixed to the gas generator housing, it is desirable in view of safety, after building all other components (the gas generating agent, a coolant and so on) into the housing, to build the collar in the final step. This collar is desirably formed of a metal, and can be fixed to the housing by welding, crimping, or screw fastening by another member.

And, a gas generator suitable to be installed on a front passenger side of a car can have a following configuration.

That is, a multi-stage ignition type gas generator in which the first combustion chamber, third combustion chamber and the second combustion chamber are next to each other axially in a housing by this order, a first ignition means is arranged on end portion of the side in which the first combustion chamber exists in the housing axial direction, and a second ignition means is arranged on end portion of the side in which the second combustion chamber exists in the housing axial direction.

Generally, when an air bag apparatus is installed on a front passenger side, a gas generator composing the apparatus is mainly installed in a dashboard (in particular, near a glove box), the gas generator is to be disposed with its part of a circumferential wall surface of the housing facing a vehicle occupant side. So, when the ignition means (the igniter in particular) is disposed in both axial end portions of the housing, it is free from restriction on disposition (wiring) of lead wires.

Of course in the above, it is possible to use on the front passenger side the gas generator having suitable a configuration to be disposed on the driver side, and to use on the driver side the gas generator having a suitable configuration to be disposed on the front passenger side.

Further, in the above gas generator, it is desirable that a coolant through which all the gases advancing to a gas discharge port pass is disposed in the third combustion chamber. It is preferable for such a coolant to be disposed only in the third chamber. In this case, the coolant functions as a common coolant having a function of cooling or filtering, or both of cooling and filtering a gas from the first combustion chamber, the second combustion chamber and third combustion chamber. The coolant can be formed by compress-molding a wove wire mesh in the axial and radial direction, winding one wire in multi layers, using one or more of a commercial plain-woven, twilled and twilled dutch wire mesh, using an expanded metal or a punched metal, or a combination thereof. In addition, in case that a gas discharge port is arranged in a circumferential wall portion of a housing formed tubular, at the time of disposing a coolant in a third combustion chamber, it is preferable to dispose such that a circular space is formed between the coolant and the circumferential wall portion of the housing, so that gas easily passes through all area of the coolant.

And, a plurality of gas discharge ports can be formed as openings having diameter of one kind or more than one kinds.

The multi-stage ignition type gas generator of the present invention can adjust an output in operation (that is, a degree of bag development) more finely in a small crash, and, in addition to being able to thus adjust operation output, can realize miniaturization of a gas generator, be made compact to eliminate a problem of disposition place, and further improve manufacturing easiness.

DETAILED DESCRIPTION OF THE INVENTION

Below, embodiments of the present invention are explained with reference to the drawings.

Figure 1:
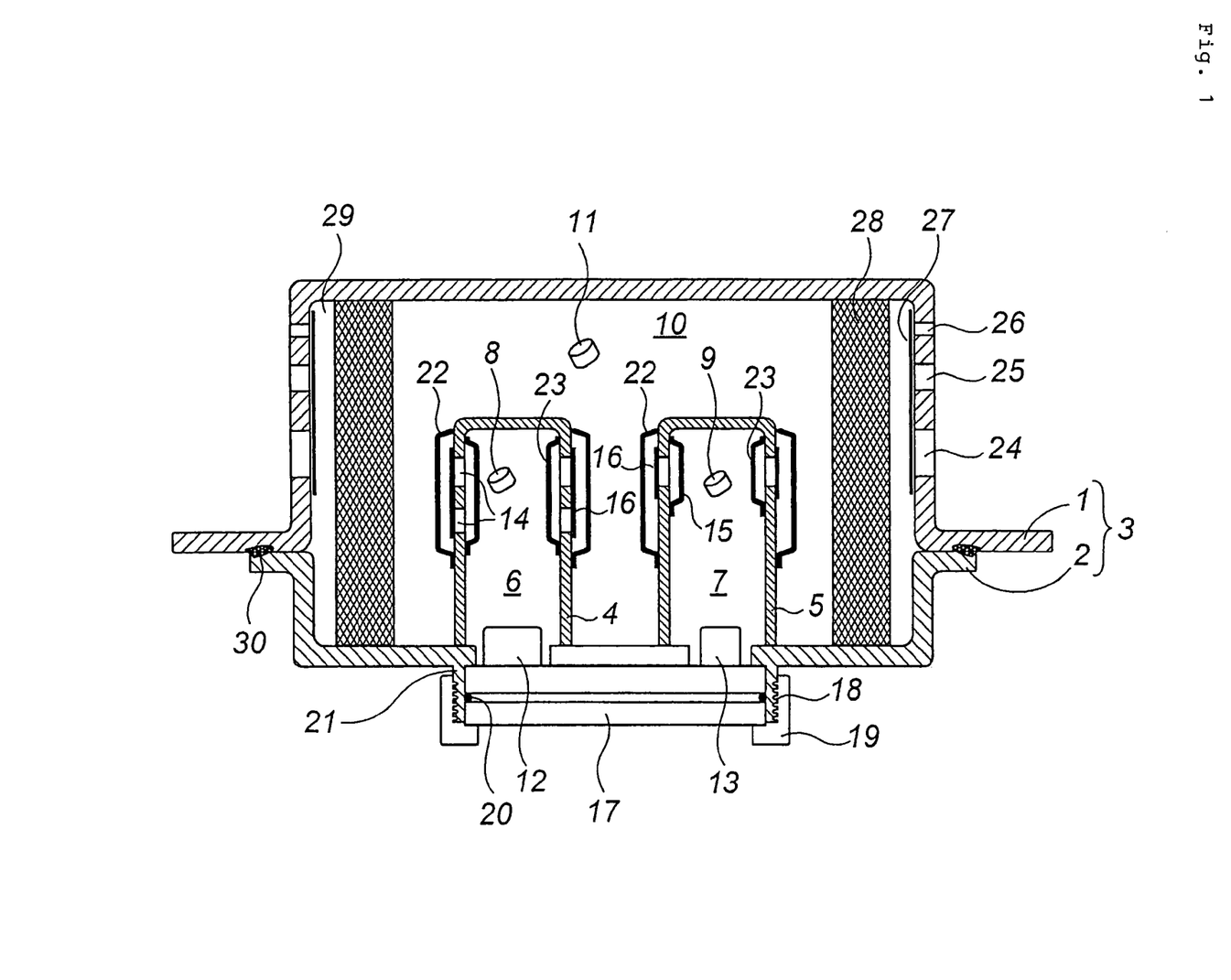
FIG. 1 is a vertical cross section showing a gas generator in Embodiment 1.

In the gas generator shown in FIG. 1, in a housing 3 formed by welding 30 of a diffuser 1 and a closure 2, as a partition wall defining a first combustion chamber and a third combustion chamber and a partition wall defining a second combustion chamber and a third combustion chamber, tubular shells 4 and 5, whose one end in an axial direction (the upper side in the drawing) is closed, are arranged, and a first combustion chamber 6 and a second combustion chamber 7 are formed therein respectively. In the first combustion chamber 6, a first gas generating agent 8 is disposed and, in the second combustion chamber 7, a second gas generating agent 9 is disposed. Furthermore, a first igniter 12 (a first ignition means) and a second igniter 13 (a second ignition means) are disposed in these combustion chambers respectively. The first igniter 12 and the second igniter 13 are fastened to the housing 3 in a state of being built in a single igniter collar 17. In order to fasten the collar 17, a portion for supporting a circumferential wall portion of the collar 17 (a supporting portion 21) is arranged in a circular bottom portion of the closure 2, a screw 18 is formed in it, and the collar is tighten by a fastening member 19 with screwing. On the circumferential wall portion of the collar 17, an O-ring 20 is installed in order to prevent penetration of outside moisture and gas leakage in operation of the gas generator, et al. In addition, as other fastening methods of the collar 17, a method of welding the collar 17 and the circular bottom portion of the closure 2, and a method of crimping the supporting portion 21 against collar 17 can be employed, and a crimping and a screwing having no thermal effect to igniters 12 and 13 are preferable. In addition, both igniters 12 and 13 can be fastened directly to the closure 2 by welding, crimping or a screw.

The shells 4 and 5 accommodating the first gas generating agent 8 and the second gas generating agent 9 can be in a shape whose one end portion is closed and another end portion is opened, not being limited to a cylindrical shape, and the open side thereof can be attached and installed to the closure 2.

In the housing 3, further a third combustion chamber 10 is formed and a third gas generating agent 11 is arranged therein. But, in the third combustion chamber, there is no igniter directly igniting the third gas generating agent.

A first communicating port 14 which makes the first combustion chamber communicate with the third combustion chamber is formed in the shell 4 and a second communicating port 15 which makes the second combustion chamber communicate with the third combustion chamber is formed in the shell 5, and these communicating ports are closed with a tape 16 made of stainless et al. respectively from the outside (from the third combustion chamber side). As for the tape 16 covering the communicating ports 14 and 15, their thickness and hardness of its material are adjusted such that the seal tape 16 is ruptured, falls off, or deforms by pressure of burnt gas generating agents 8 and 9 in each shell, but not ruptured, does not fall off, or does not deforms in burning of the third gas generating agent 11 in the third combustion chamber. In this embodiment shown in FIG. 1, the tape 16 is used as a restriction means in the present invention.

In addition, in the gas generator in which a combustion chamber is defined by using a partition wall in the same shape as or a similar shape to the shells 4 and 5 shown in FIG. 1, further as a restriction means, the aspect shown in FIGS. 2(*a*)–2(*d*) can be used. FIGS. 2(*a*)–2(*d*) are principal part enlarged views in the vicinity of the shell 4 in the gas generator shown in FIG. 1 for showing embodiments of restriction means.

In an aspect shown in FIG. 2(*a*), a shell 104 that is a partition wall defining the first combustion chamber in the third combustion chamber is in a cylindrical shape in which the lower end is fixed inside the housing, the upper end is open and the opening is provided with a stepped portion. And, as a restriction means, a cover 116 fixed to this stepped portion (a cover closing an upper end side opening of the shell 104) is used. In the aspect shown in this drawing, when the gas generating agent 8 in the first combustion chamber 6 is burnt, this cover 116 falls off the stepped portion (moves), the opening on the upper end side of the shell 104 opens, and this opening functions as a first communicating port 114. On the other hand, even if the third gas generating agent 11 in the third combustion chamber 10 is burnt, the cover 116 is supported by the stepped portion, so that the opening of the upper end side of shell 104 does not open. Of course, in the aspect shown in this drawing, the second shell side can have a similar configuration.

In the aspect shown in FIG. 2(*b*), as a restriction means, a check valve 216 is used instead of the tape 16 shown in the above FIG. 1. This check valve closes the first communicating port 14 from the third combustion chamber 10 side, and when the gas generating agent 8 in the first combustion chamber 6 is burnt, this check valve 216 bends into the third combustion chamber side as shown by a dotted line in this drawing and it deforms, opening the first communicating port 14. On the other hand, even if the third gas generating agent 11 in the third combustion chamber 10 is burnt, the check valve 216 is supported by the shell 4 and does not deform, so that the first communicating port 14 does not open. In the aspect shown in this drawing, the second shell side can have a similar configuration.

In the aspect shown in FIG. 2(*c*), as a restriction means, a member 316 facing the first communicating port 14 and disposed in the third combustion chamber side is used. This member 316 comprises a wall portion 300 facing the first communicating port 14 and a fastening portion 301 fastening this wall portion to the shell 4. In particular, the wall portion 300 forms a space 302 of extent that the gas generating agent does not get into, between this wall portion and an outer circumferential wall surface of the shell 4. In addition, this member 316 generally has a similar shape to a shielding member 22 described later, and can accompany with an effect of supporting a gas generating agent. So, the shielding member 22 can be omitted by using the member 316. Of course, both of the member 316 and the shielding member 22 can be used.

Figure 2A:
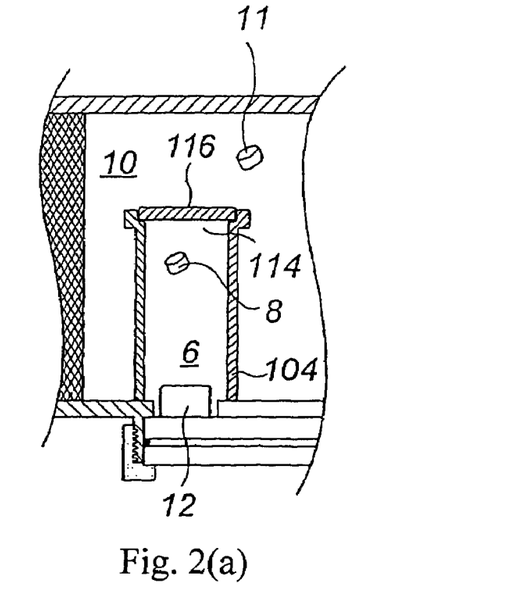
FIG. 2 is a principal cross section showing an embodiment of a restriction means.
Figure 2B:
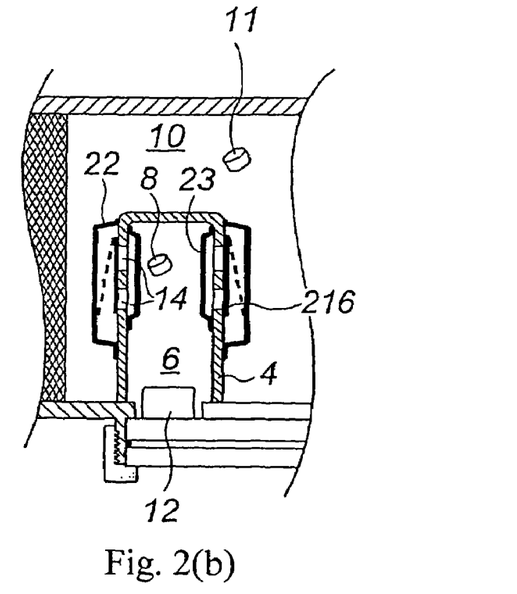
Figure 2C:
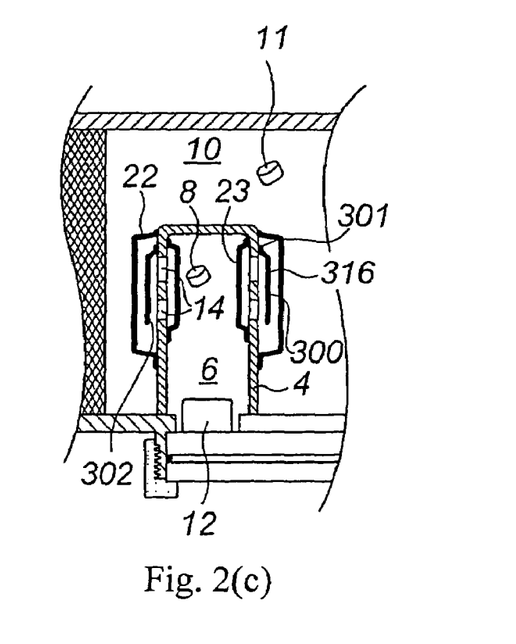
Figure 2D:
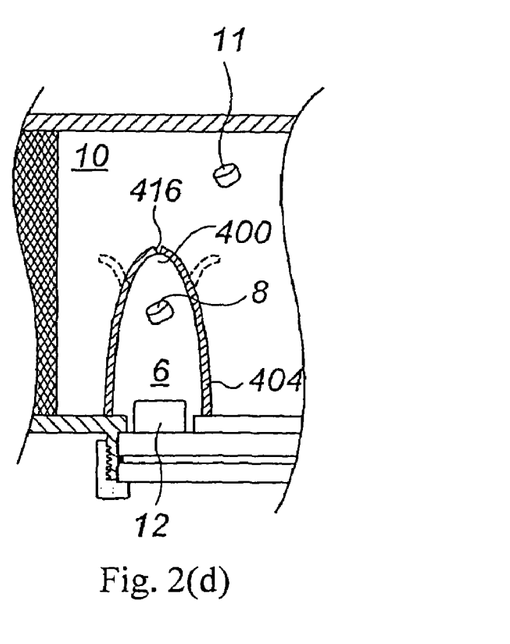

As to such a member 316, when the gas generating agent 8 in the first combustion chamber 6 is burnt, gas discharged from the first communicating port 14 passes through a space 302 between the outer circumferential wall surface of the shell 4 and the wall portion 300 to be discharged into the third combustion chamber. However, even when the third gas generating agent 11 in the third combustion chamber 10 is burnt, the gas does not pass through the space 302 to reach the first communicating port 14. That is, in this aspect, even when the gas generating agent in the third combustion chamber is burnt, the first combustion chamber and the third combustion chamber do not communicate with each other in a point of substantial passage of gas or flame, and therefore, both combustion chambers can be considered to be closed as a matter of fact by a space 302 between the outer circumferential wall surface of the shell 4 and the wall portion 300. On the other hand, as to the combustion chamber on the side in which the member 316 is arranged (the first combustion chamber), it communicates with the third combustion chamber only by pressure of the gas generated in the combustion chamber, and therefore, the communicating port can substantially be considered to be opened when both chambers communicates with each other. So, such a member shown in this FIG. 2(*c*) is included in a restriction means in the present invention, too. In the aspect shown in this drawing, the second shell side can have a similar configuration.

In the aspect shown in FIG. 2(*d*), a shell 404 which is a partition wall defining the first combustion chamber in the third combustion chamber is formed in a substantially circular cone shape with its open end portion installed on the housing, and a ditch 416 having a V-shaped cross section is arranged in the crown of an upper end side (a bent portion 400), as restriction means. In the aspect shown in this drawing, when the gas generating agent 8 in the first combustion chamber 6 is burnt, this ditch 416 is broken, so that the shell 404 deforms as shown by dotted line in the drawing, to make an open communicating port appear. On the other hand, even when the third gas generating agent 11 in the third combustion chamber 10 is burnt, pressure added to the shell 404 acts on a direction narrowing the ditch 416 and does not break this, so that an open communicating port does not appear. In addition, in an aspect shown in this FIG. 2(*d*), it is also possible to form one or more bent portions projecting radially and outwardly (to the third combustion chamber side) on a circumferential wall surface of the shell 4 formed as shown in FIG. 1, thereby forming a ditch 416 in that. In the embodiment shown in this drawing, the second shell side can have a similar configuration.

Furthermore, in the aspects shown in the FIGS. 2(*a*)–2(*d*), it is possible that one is formed as either aspect in FIGS. 2(*a*)–2(*d*) and another is formed as an aspect other than former one.

In addition, in the gas generator shown in FIG. 1, shielding members (shielding means) 22 and 23 are installed to prevent direct contact of each communicating port 14 and 15 with the gas generating agents 8, 9 and 11. The shielding member 22 is installed from the third combustion chamber side such that the third gas generating agent 11 is not in contact with the first and the second communicating port, and a free space for the seal tape 16 to deform is secured. The shielding member 23 is installed in the first combustion chamber and the second combustion chamber, and prevents a situation that a gas generating agent and a communicating port (8 and 14, and 9 and 15) are in contact. The shielding member 22 and 23 can be formed of a wire mesh or a multi-perforated plate (a punched metal, an expanded metal and so on). The first gas generating agent is different from the second gas generating agent in at least one of loaded amount, shape, size, composition and composition ratio, and, in the example shown in FIG. 1, composition, composition ratio, shape and size are same, but loaded amount is different (loaded amount in the first combustion chamber 6 is more than that in the second combustion chamber 7). Then, by correlating the total surface area of the gas generating agent disposed in each combustion chamber with the total opening area of communicating ports 14 and 15, combustion performance of each gas generating agent 8 and 9 (burning velocity, et al.) can be adjusted respectively by the communicating ports 14 and 15.

Similarly in FIG. 1, the loaded amount of the third gas generating agent 11 is also different from that of the first gas generating agent 8 and the second gas generating agent 9, but it can be same as either one. In addition to loaded amount, composition, composition ratio, shape and size can be completely different from these of the first gas generating agent 8 and the second gas generating agent 9, or can be same as these of either one. Gas discharge ports 24, 25 and 26 of three sizes for discharging gas are formed in a circumferential wall portion of the diffuser 1, and these gas discharge ports are closed with an aluminum seal tape 27 from the inside of the housing. Diameter of a gas discharge port 24 is bigger than that of a gas discharge port 25, and diameter of 25 is bigger than that of 26. Gas discharge ports having three kinds of diameters are arranged as shown in FIG. 1. By this, aluminum tapes 27 covering the gas discharge ports 24, 25 and 26 can be ruptured in multi stages, and pressure change inside the housing 3 in combustion can be decreased, and in addition, a situation in which output of the gas generator becomes different depending on environmental temperature can be prevented. Although gas discharge ports having three kinds of diameter are shown in FIG. 1, by increasing kinds of diameter further, adjusting can be made more finely.

In FIG. 1, for example, if composition, composition ratio, shape and size of the gas generating agent loaded in each combustion chamber are the same, and each loaded amount is as follows;

15 g in the first combustion chamber 6 (the first gas generating agent), 5 g in the second combustion chamber 7 (the second gas generating agent), and 30 g in the third combustion chamber 10 (the third gas generating agent), in the case of a great impact, both igniters 12 and 13 are ignited (that is, activated) simultaneously and 50 g (that is, 15 g+5 g+30 g) of gas generating agent is burnt all at once.

On the other hand, when an impact is small, only one of igniters 12 and 13 is ignited, and 45 g (that is, 15 g+30 g) or 35 g (that is, 5 g+30 g) of gas generating agents is burnt. Thus, igniters to be ignited are selected depending on a slight difference in strength and weakness of an impact at that time, and development of an air bag can be adjusted more finely.

In addition, when an impact is intermediate, one igniter is ignited first, and the remaining igniter is ignited afterwards with a little interval (for example, about 10 to 40 msec). Also in this case, depending on degree of an impact, development of an air bag can be adjusted more finely by adjusting which igniter is ignited first, or adjusting a period of time until the remaining igniter is ignited.

As to diameter and the number of gas discharge ports 24, 25 and 26, for example, by correlating gas discharge ports 24, 25 and 26 with the surface areas of the third gas generating agent (30 g, for example), the first gas generating agent (15 g, for example) and the second gas generating agent (5 g, for example) respectively, excess and deficiency of combustion internal pressure is not produced so that the gas discharge ports 24 and 25 are opened by the activation of the first igniter 12 and subsequently, the gas discharge port 26 is opened. In particular, when the gas generating agent contains a nitrogen-containing compound, burning in a circumstances of insufficient pressure causes generation of nitrogen oxides, and therefore, it is preferable to open gas discharge ports in multi-stages and to adjust combustion internal pressure finely.

Furthermore, in the third combustion chamber 10, a coolant 28 functioning at least one of cooling a gas generated in each combustion chamber and collecting residue in a combustion gas is disposed. The coolant 28 is formed circular, and is disposed such that a space 29 is secured between its outer circumferential surface and the circumferential wall surface of the housing 3. Since, due to this space 29, a combustion gas generated inside passes through all area of the coolant 28 to reach the gas discharge ports 24, 25 and 26, coolant-efficiency or cooling efficiency are improved.

Figure 3:
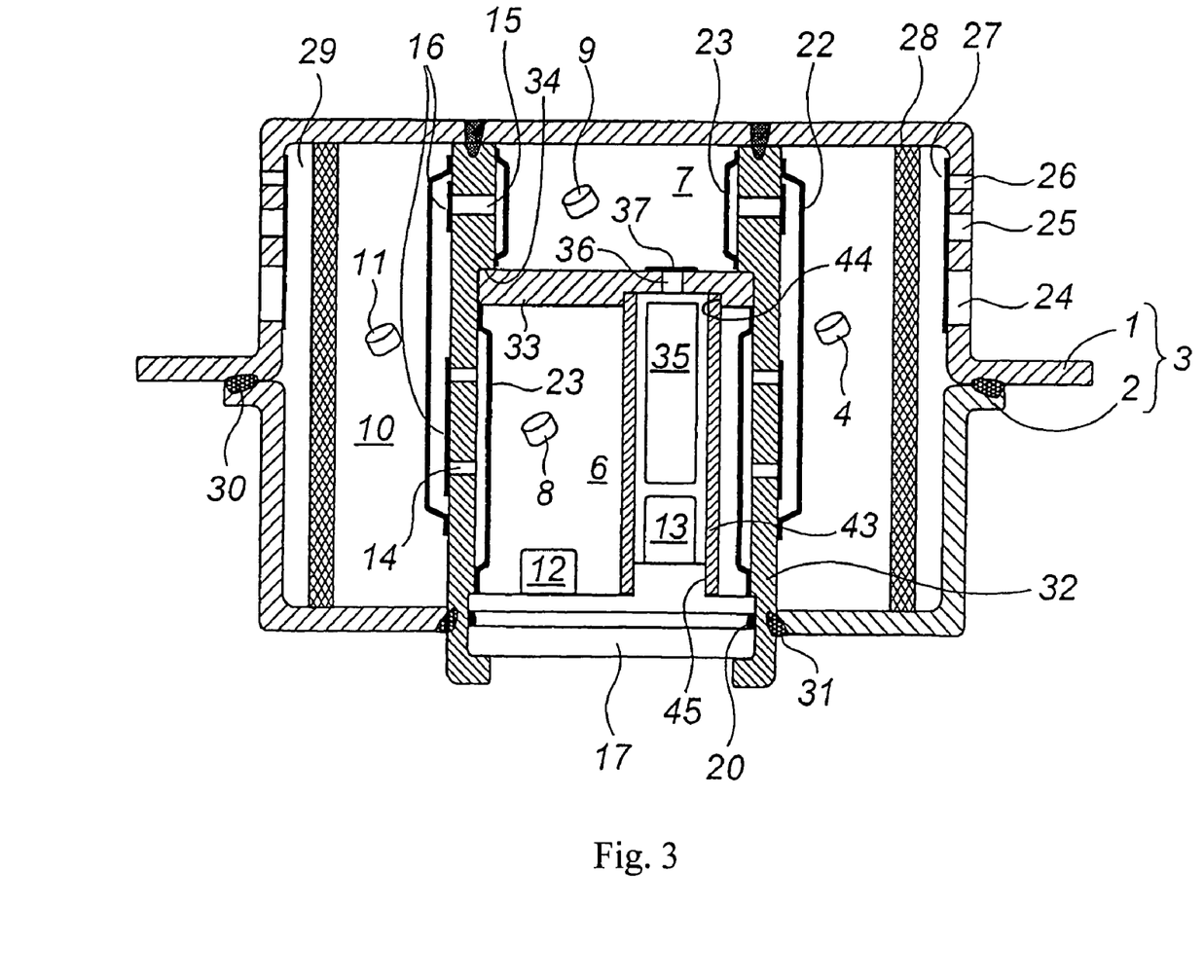
FIG. 3 is a vertical cross section showing a gas generator in Embodiment 2.

FIG. 3 shows a multi-stage ignition type gas generator which is different from one shown in FIG. 1 in disposition of combustion chambers. In FIG. 3, those which have same function as those shown in FIG. 1 are given the same reference numeral and its explanation is omitted.

In a housing of a gas generator in FIG. 3, an inner cylinder 32 is disposed coaxially with the central axis of the housing, being joined by welding 30 and 31 to form an outer shell container. In the inner cylinder 32, a first combustion chamber 6 and a second combustion chamber 7 are formed side-by-side in the housing axial direction. In addition, a third combustion chamber 10 of a doughnut shape (a hollow cylinder shape) is formed outside of the inner cylinder 32, and a coolant 28 is disposed therein.

In the inner cylinder 32, there is a partition wall 33 defining the first combustion chamber 6 and the second combustion chamber 7. The partition wall 33 is pressed against the inner cylinder 32 and is fixed with its circumferential edge portion joined with a stepped portion 34 arranged on an inner circumferential portion of the inner cylinder 32. So in this aspect, the part lower than the partition wall 33 in the inner cylinder 32 (an area where the first combustion chamber 6 exists) becomes a partition wall defining the first combustion chamber and the third combustion chamber, and the part upper than the partition wall 33 in the inner cylinder 32 (an area where the second combustion chamber 7 exists) becomes a partition wall defining the second combustion chamber and the third combustion chamber.

In addition, in a circumferential wall of the inner cylinder 32, a first communicating port 14 communicating the first combustion chamber 6 with the third combustion chamber 10, and a second communicating port 15 communicating the second combustion chamber 7 with the third combustion chamber 10 are formed respectively, and each of them is closed with a tape 16 made of stainless as a restriction means from the third combustion chamber 10 side. Function of this stainless tape is the same as a stainless tape of FIG. 1. In addition, also in the aspect shown in this FIG. 3, aspects shown in the FIGS. 2(a)–2(d) can be used as a restriction means. In particular, when the first combustion chamber and the second combustion chamber are disposed as shown in this FIG. 3, the first communicating port 14 and the second communicating port 15 are disposed in the axial direction of the inner cylinder 32, so that it is preferable to use an aspect shown in FIG. 2(c) as a restriction means.

Furthermore, shielding means 22 and 23 are attached to the first communicating port 14 and the second communicating port 15 to prevent a contact with the gas generating agents 8, 9 and 11. This shielding means has the same function and material as those of the shielding means of FIG. 1.

In a closure 2 side edge portion of the inner cylinder 32, there is installed a single igniter collar 17, in which a first igniter 12 and a second igniter 13 are build. Above the second igniter 13, an enhancer 35 is disposed, forming the second ignition means. The enhancer 35 has a function to amplify ignition energy of the second igniter 13. An opening 36, which leads a flame, a high-temperature gas and so on from the second ignition means to the second combustion chamber, is formed in the partition wall 33, and the opening 36 is closed with a seal tape 37. Surrounding the second igniter 13 and the enhancer 35, and between the collar 17 and the partition wall 33, a circular member 43 extends through the first combustion chamber. By this, ignition flame of the first (or second) igniter is not transferred to the second (or first) igniter side. The circular member 43 has its circumferential edge of upper end portion abutted against an interior circumferential surface of a concave portion 44 in the partition wall 33, and its circumferential edge of lower end portion abutted against a circumferential wall surface of a protrusion 45 in the collar 17. Similarly to the configuration in FIG. 1, also in the gas generator of FIG. 3, only a loaded amount of a gas generating agent loaded in each combustion chamber 6, 7 and 10 is changed, and which of the first igniter and the second igniter is ignited is determined according to a degree of the impact by a not shown electric control unit, and the determined igniter is ignited. Operation mechanism is similar to that of the gas generator shown in FIG. 1. In addition, correlation of opening areas of the communicating ports 14, 15, the gas discharge ports 24, 25 and 26 with surface area of each gas generating agent, and mechanism of a multi-stage rupture of the seal tape 27 are same as a case shown in FIG. 1.

Figure 4:
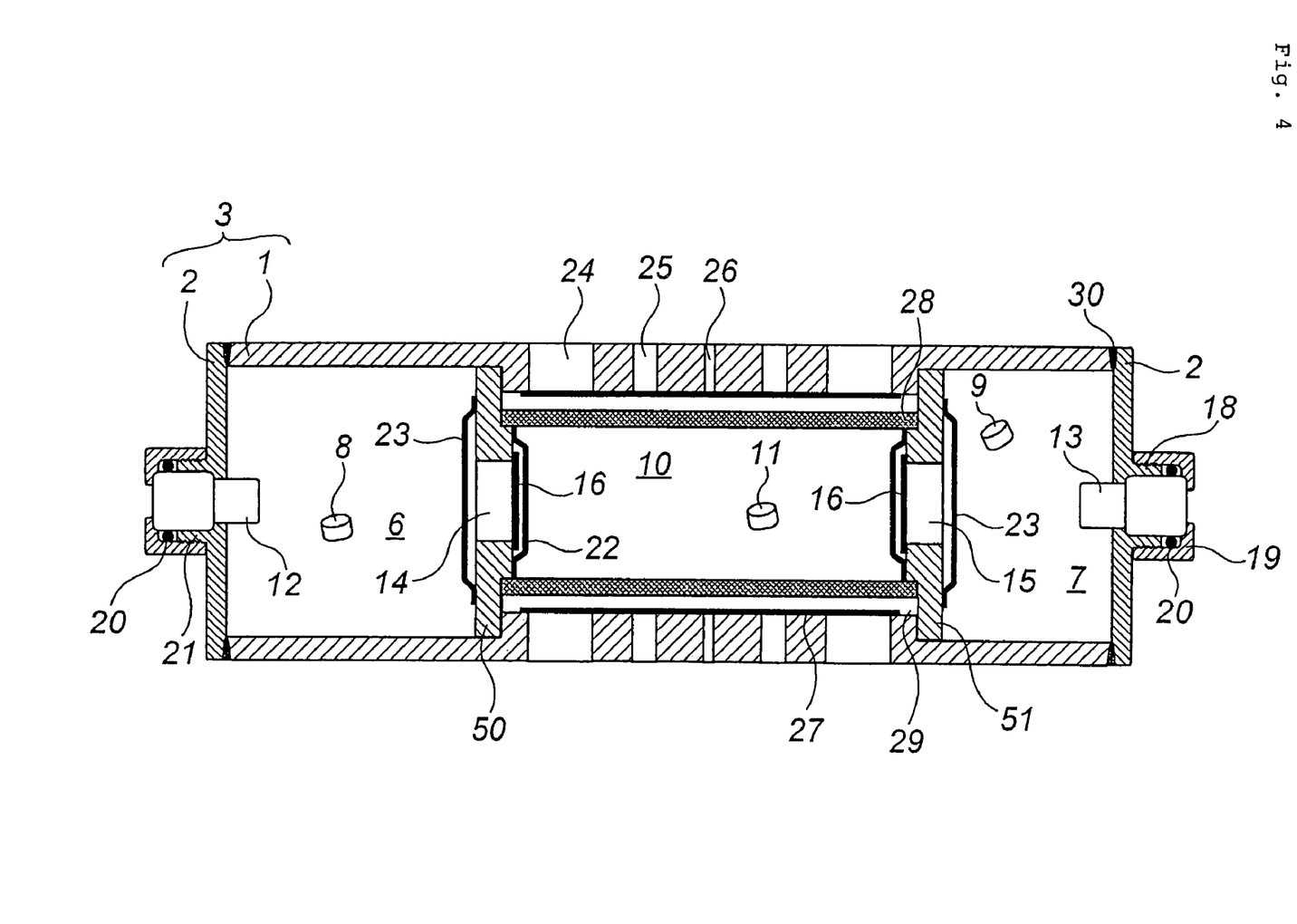
FIG. 4 is a vertical cross section showing a gas generator in Embodiment 3.

FIG. 4 shows another embodiment of the present invention. In a circumferential wall portion of an extended shaft shaped tubular diffuser 1, gas discharge ports 24, 25, and 26 are formed, which are closed with a seal tape 27 respectively. In a housing 3 comprising the diffuser 1 and circular shaped members 2 attached to both end opening portions of the diffuser 1, as partition walls defining a first combustion chamber and a third combustion chamber, and a second combustion chamber and the third combustion chamber, partitioning members 50 and 51 are arranged, dividing the inside of the housing 3 into three chambers. Since a gas generator shown in FIG. 4 has such an entire shape, it is suitable for use in an air bag apparatus for a front passenger side of a vehicle.

A space formed by the circular shaped member 2, the partitioning member 50 and the diffuser 1 is formed as the first combustion chamber 6, in which a required amount of the first gas generating agent 8 is disposed. In addition, a space formed by the circular shaped member 2, the partitioning member 51 and the diffuser 1 is formed as the second combustion chamber 7, in which a required amount of the second gas generating agent 9 is accommodated. Further, a space formed by the two partitioning members 51 and 52 and the diffuser 1 is formed as the third combustion chamber 10, in which a coolant 28 is accommodated, and in which a required amount of the third gas generating agent 11 is accommodated in a space formed by an internal circumference portion of the coolant. A first communicating port 14 communicating the first combustion chamber 6 and third combustion chamber 10 is formed in the partitioning member 50, and a second communicating port 15 communicating the second combustion chamber 7 and third combustion chamber 10 is formed in the partitioning member 51, each communicating port being closed with a metal tape 16 attached from the third combustion chamber side as a restriction means. In addition, shielding means 22 and 23 are attached to each of the first communicating port and the second communicating port. The shielding means have the same function and material as those of shielding means shown in the FIGS. 1 and 3, and operation mechanism of the tape 16 is also same as that of the tape 16 shown in the FIGS. 1 and 3. Instead of the tape 16, aspects shown in the FIGS. 2(a)–2(d) can be used as a restriction means. In particular, when the flat plate shaped partitioning members 50 and 51 are used as partition walls as shown in this FIG. 4, in installing a cover 116 shown in the FIG. 2(a), a stepped portion can be formed in the third combustion chamber side in each communicating port, the cover 116 being fixed in this stepped portion. In particular, when a flat plate shaped partition wall is used as shown in this FIG. 4, it is preferable to use aspects shown in above FIGS. 2(a)–(c) as a restriction means.

FIG. 4 shows a case in which gas generating agents, which have the same composition ratio, the same shape, and the same size, and differing from each other only in a loaded amount, are disposed.

In the gas generator shown in FIG. 4, each communicating port 14 and 15 comprises a single port, but each can comprise a plurality of openings as long as the total opening area is the same as that of the single port.

As shown in the drawing, an igniter activated by an ignition electric current on receiving the impact (a first igniter 12 and a second igniter 13) are installed in the first combustion chamber 6 and the second combustion chamber 7 respectively, but there is not such an igniter in the third combustion chamber.

In the gas generator of FIG. 4, gas discharge ports 24, 25 and 26 are formed in a circumferential wall of a corresponding portion, of the diffuser 1, to the third combustion chamber 10. By specifying formation place of gas discharge ports, similarly to the gas generators of FIGS. 1 and 3, gases generated from the first combustion chamber and the second combustion chamber pass through the third combustion chamber to be discharged from the gas discharge ports 24, 25 and 26. That is, the gas generating agent in the third combustion chamber (the third gas generating agent 11) is burnt by high-temperature gas or flame generated by combustion of at least one of the first gas generating agent 8 or the second gas generating agent 9. Similar to the gas generators shown in FIGS. 1 and 3, also in this gas generator, decisions such as which igniter of the igniters 12 and 13 is ignited first, which one is ignited, or both of them are ignited simultaneously are made according to a degree of an impact, and the gas generator is operated accordingly. In addition, the sizes of the gas discharge ports 24, 25 and 26 get smaller in the order of 24, 25 and 26, and each discharging port is closed with a seal tape 27 having the same thickness. This mechanism of making diameters of discharge ports different (operation and mechanism) is the same as that explained based on the FIGS. 1 and 3. In order to rupture in multi stages, instead of difference in the diameters of gas discharge ports 24, 25 and 26, it is also possible to make thickness of the seal tape 27 different, or both of diameters of gas discharge ports and thickness of the seal tape different. This is the same in the gas generator of FIGS. 1 and 3, too.

In the gas generator shown in this FIG. 4, although the igniters 12 and 13 are installed in both end portions of the housing 3, as long as they are disposed in the first combustion chamber 6 and the second combustion chamber 7 respectively, the place to be installed is not limited, for example, they are installed on the same sides of the circumferential wall surface of the diffuser 1. In this case, since the igniters 12 and 13 are installed in the same direction, it can be a gas generator usable in an air bag apparatus for a driver side. In addition, as to size of the housing 3, it is possible to make a radially bigger shape without changing internal configuration.

The invention claimed is:

1. A multi-stage ignition type gas generator, comprising:
a housing having a gas discharge port;
a first combustion chamber provided inside the housing;
a second combustion chamber provided inside the housing separately from the first combustion chamber;
a third combustion chamber provided inside the housing and through which a gas generated in at least one of the first combustion chamber and the second combustion chamber passes before reaching the gas discharge port;
a first partition wall separating the first combustion chamber and the third combustion chamber and defining a first communicating port that communicates the first combustion chamber and the third combustion chamber;
a second partition wall separating the second combustion chamber and the third combustion chamber and defining a second communicating port that communicates the second combustion chamber and the third combustion chamber;
first restriction means that seals the first communicating port, the first restricting means allowing communication between the first combustion chamber and the third combustion chamber only by a gas pressure generated in the first combustion chamber;
second restriction means that seals the second communicating port, the second restriction means allowing communication between the second combustion chamber and the third combustion chamber only by a gas pressure generated in the second combustion chamber;
a first gas generating agent accommodated in the first combustion chamber for generating a first combustion gas for inflating an air bag;
a second gas generating agent accommodated in the second combustion chamber for generating a second combustion gas for inflating the air bag;
a third gas generating agent accommodated in the third combustion chamber for generating a third combustion gas for inflating the air bag;
a first ignition means for directly igniting and burning the first gas generating agent;
a second ignition means for directly igniting and burning the second gas generating agent; and
shielding means, which prevents at least one of the first communication port and the second communication port from being obstructed by at least one of the first gas generating agent, the second gas generating agent, and the third gas generating agent,
wherein, the first gas generating agent and the second gas generating agent are different in at least one of combustion heat, combustion temperature, all gas output, and gas output per unit time in combustion of the gas generating agent.

2. The multi-stage ignition type gas generator as claimed in claim 1, wherein the first restriction means seals the first communicating port from the third combustion chamber side.

3. The multi-stage ignition type gas generator as claimed in claim 2, wherein the first restriction means at least one of deforms, destructed by fire, detaches from the first partition wall, displaces, ruptures, and breaks only by combustion of the first gas generating agent and opens the first communicating port.

4. The multi-stage ignition type gas generator as claimed in claim 3, wherein the first restriction means is selected from the group consisting of a metal tape, a cover, and a check valve that closes the first communicating port.

5. The multi-stage ignition type gas generator as claimed in claim 1 or 2, wherein the first ignition means includes a first igniter and the second ignition means includes a second igniter for initiating operation of the gas generator, and the first igniter and the second igniter are attached to a single common igniter collar attached to the housing.

6. The multi-stage ignition type gas generator as claimed in claim 1 or 2, further comprising:
a coolant that defines the third combustion chamber therein,
wherein, the first combustion gas, the second combustion gas, and the third combustion gas pass through the coolant before being discharged from the discharge port.

7. The multi-stage ignition type gas generator as claimed in claim 1 or 2, wherein the shielding means is made of one of a wire mesh and a multi-perforated plate.

8. The multi-stage ignition type gas generator as claimed in claim 1, wherein the second restriction means seals the second communicating port % from the third combustion chamber side.

9. The multi-stage ignition type gas generator as claimed in claim 1, wherein the shielding means is made of one of a wire mesh and a multi-perforated plate.

* * * * *